117,726

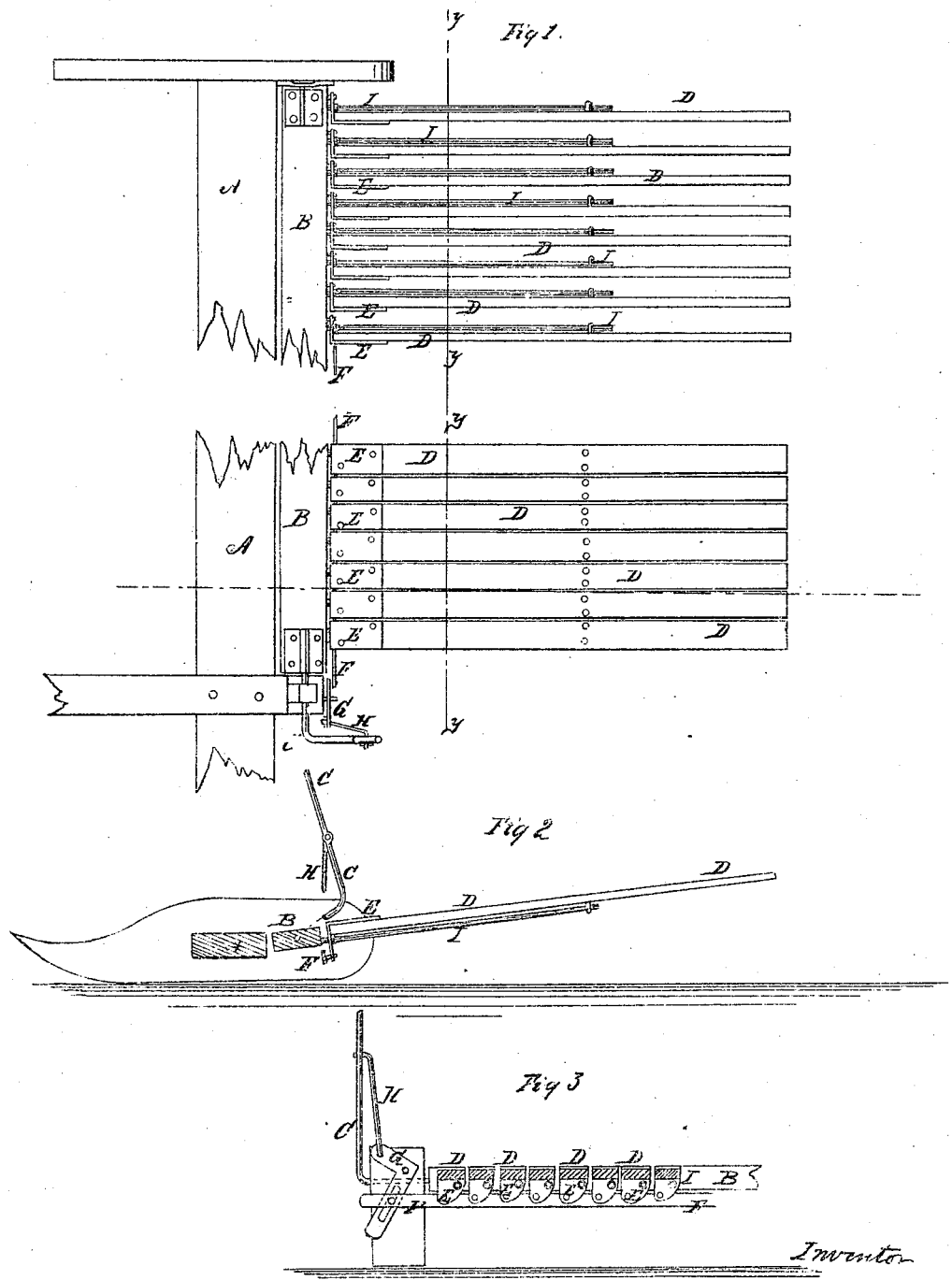

UNITED STATES PATENT OFFICE.

J. J. BARNHILL AND D. N. BARNHILL, OF VINCENNES, INDIANA.

IMPROVEMENT IN HARVESTER-DROPPERS.

Specification forming part of Letters Patent No. 117,726, dated August 8, 1871.

*To all whom it may concern:*

Be it known that we, J. J. BARNHILL and D. N. BARNHILL, of Vincennes, in the county of Knox and State of Indiana, have invented a new and useful Improvement in Dropper or Self-Raking Attachment for Reapers; and we do hereby declare that the following is a full, clear, and exact description thereof, which will enable others skilled in the art to make and use the same, reference being had to the accompanying drawing forming part of this specification, in which—

Figure 1 is a top view of a portion of our improved reaper-platform, opened to discharge the grain. Fig. 2 is a top view of a portion of the same closed to receive the grain. Fig. 3 is a detail sectional view of the same taken through the line *x x*, Fig. 2. Fig. 4 is a detail sectional view of the same taken through the line *y y*, Figs. 1 and 2.

Similar letters of reference indicate corresponding parts.

Our invention has for its object to improve the construction of J. F. Seiberling's patent dropper or self-raking attachment for reapers, so as to make it more satisfactory and effective in operation, saving a large amount of grain that would otherwise be lost by falling through the spaces between the slats; and it consists in so constructing and arranging the slats of the dropper that they may be partially revolved by means hereinafter described.

In these droppers, when a sufficient quantity of grain has been received to form a gavel the dropper is lowered so that the stubble may pass through the spaces between the slats and hold the grain while the said slats are being withdrawn from beneath it. The dropper is then raised to again receive the grain for another gavel. Removing the grain in this way requires that the spaces between the slats should be at least an inch and a half or two inches wide, to allow the stubble to pass through in sufficient quantity to hold or detain the grain. These wide spaces, when the grain is short, or thin, or straight, and without side blades, allow large quantities of the grain to drop through and be lost. To remedy this the slats of the dropper are constructed so that when raised to receive the grain the adjacent edges of slats may be close together, forming a close platform, which will retain all the grain that may fall upon it; as the dropper is lowered to deposit the grain and by the same operation the slats are partially revolved or turned edgewise to form spaces of sufficient width for the stubble to pass through to detain the grain while the slats are being withdrawn from beneath it. As the dropper is again raised the slats are again partially revolved or turned flatwise to form a close platform to again receive the grain. We will now proceed to describe the way in which this is done.

A represents the guard-bar of a reaper, at and parallel with the rear edge of which is placed a bar, B, the ends of which are pivoted to suitable supports attached to or connected with said guard-bar. To the inner end of this pivoted bar B is attached a lever, C, by means of which the bar is turned upon its pivots to lower and raise the platform. D are the slats that form the platform of the dropper, which are so arranged that when turned edgewise, as shown in Fig. 1, spaces two inches wide, more or less, may be left between them, and when turned flatwise, as shown in Fig. 2, their adjacent edges may be close together, forming a close platform. To the inner ends of the slats D are attached angle-irons E, the other ends of which are pivoted to a bar, F, running and sliding along the lower edge of the pivoted bar B. The inner end of the bar F has a pivoting-pin or bolt attached to it, which passes through and works in a slot in the lower arm of the bent or angle-lever G, which is pivoted at its angle to the guard-bar A, or to some suitable support attached to or connected with said guard-bar. To the upper arms of the bent lever G is pivoted the lower end of the connecting-rod H, the upper end of which is pivoted to the lever C, so that when the lever C is operated to lower and raise the dropper the slats D may at the same time, and by the same operation, be partially revolved to open and close the platform. The slats D may be supported and kept from warping out of line with each other by the stay-rods I, the inner ends of which are attached to the lower parts of the angle-irons E, and the outer ends of which pass through staples or keepers attached to the lower sides of the slats D, as shown in the drawing.

Having thus described our invention, we claim as new and desire to secure by Letters Patent—

1. The combination of the angle-irons E, sliding-bar F, slotted bent lever G, and connecting-rod or bar H, with the pivoted slats D, pivoted bar B, guard-bar A, and lever C, all arranged and operating substantially as herein shown and described, and for the purpose set forth.

2. The combination of the stay-rods I with the pivoted slats D and angle-irons E, substantially as herein shown and described, and for the purpose set forth.

J. J. BARNHILL.
D. N. BARNHILL.

Witnesses:
J. A. HENDERSON,
G. W. WISE.